United States Patent
Tej et al.

(10) Patent No.: US 8,592,349 B2
(45) Date of Patent: Nov. 26, 2013

(54) METHOD TO PREVENT SALT CRYSTAL AGGLOMERATION AND SETTLING IN A DRILLING FLUID

(75) Inventors: Mohammad Tej, Houston, TX (US); Stephen Bruce Fry, Houston, TX (US); John B. Trenery, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 128 days.

(21) Appl. No.: 12/715,764

(22) Filed: Mar. 2, 2010

(65) Prior Publication Data

US 2010/0227781 A1    Sep. 9, 2010

Related U.S. Application Data

(60) Provisional application No. 61/158,236, filed on Mar. 6, 2009.

(51) Int. Cl.
  *C09K 8/06*    (2006.01)
  *C09K 8/04*    (2006.01)

(52) U.S. Cl.
  USPC ........... 507/110; 507/139; 507/140; 507/141; 175/65

(58) Field of Classification Search
  None
  See application file for complete search history.

(56) References Cited

U.S. PATENT DOCUMENTS

| | | | |
|---|---|---|---|
| 2,600,404 A * | 6/1952 | Hoeppel | 507/111 |
| 3,078,187 A * | 2/1963 | Bravos et al. | 127/33 |
| 3,417,017 A * | 12/1968 | Kolaian et al. | 507/111 |
| 5,635,101 A | 6/1997 | Janke et al. | |
| 5,709,812 A | 1/1998 | Janke et al. | |
| 5,709,813 A | 1/1998 | Janke et al. | |
| 5,919,394 A | 7/1999 | Janke et al. | |
| 5,932,135 A | 8/1999 | Janke et al. | |
| 5,965,058 A | 10/1999 | Janke et al. | |
| 2003/0092584 A1 | 5/2003 | Crews | |
| 2006/0019834 A1 | 1/2006 | Melbouci et al. | |
| 2006/0086502 A1 | 4/2006 | Reddy et al. | |
| 2006/0258541 A1 * | 11/2006 | Crews | 507/203 |
| 2007/0166541 A1 | 7/2007 | Smith et al. | |
| 2008/0058226 A1 | 3/2008 | Greaves et al. | |

OTHER PUBLICATIONS

Disclosed Anonymously, "Double Loading Sodium Chloride Base Mud for Riserless Drilling," An IP.com Prior Art Database Technical Disclosure, IP.com No. IPCOM000218321D, Jun. 1, 2012.

* cited by examiner

*Primary Examiner* — John J Figueroa
(74) *Attorney, Agent, or Firm* — Mossman Kumar & Tyler PC

(57) ABSTRACT

Various salt crystal and agglomeration settling inhibiting agents may aid the ability to keep salt crystals of a desired particle size undissolved and dissolved in an aqueous drilling fluid, including, whey, wine-making residues, "steepwater solubles" or an organic liquid formed from the residue of wet processing of grains, sugar cane, sugar beets, and similar plants for the food and beverage industries for consumption by human or animals, and combinations thereof. A fluid so treated has more uniform properties and a reduced tendency for the salt therein to settle out as compared to an otherwise identical fluid absent an effective proportion or amount of the salt crystal agglomeration and settling inhibiting agent, even for saturated salt fluids. The salt crystal agglomeration and settling inhibiting agents are also believed to be useful in inhibiting or preventing the formation of gas hydrates under gas hydrate forming conditions of low temperature and high pressure.

16 Claims, 2 Drawing Sheets

METHOD TO PREVENT SALT CRYSTAL AGGLOMERATION AND SETTLING IN A DRILLING FLUID

CROSS-REFERENCE TO RELATED APPLICATION

This application claims the benefit of U.S. Provisional Patent Application Ser. No. 61/158,236 filed Mar. 6, 2009.

TECHNICAL FIELD

The present invention relates to methods and compositions for inhibiting or preventing dissolved salts from settling out of a water-based mud, and more particularly relates, in one non-limiting embodiment, to methods and compositions for inhibiting or preventing undissolved and dissolved salts from forming crystal agglomerates that then form larger aggregates of crystals within the fluid or may settle out of a salt-saturated aqueous drilling fluid, which methods and compositions are reliable, cost-effective and environmentally friendly, as well suppressing, inhibiting and preventing the formation of gas hydrates in aqueous fluids.

BACKGROUND

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds". The drilling fluid should carry cuttings from beneath the bit, transport them through the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. The drilling fluid may also be used to collect and interpret information available from drill cuttings, cores and electrical logs. It will be appreciated that within the scope of the description and claims herein, the term "drilling fluid" also encompasses "drill-in fluids" and "completion fluids".

Drilling fluids are typically classified according to their base fluid. In water-based muds, solid particles are suspended in water or brine. Oil can be emulsified in the water. Nonetheless, the water is the continuous phase. Brine-based drilling fluids, of course are a water-based mud (WBM) in which the aqueous component is brine. Oil-based muds (OBM) are the opposite or inverse. Solid particles are suspended in oil, and water or brine is emulsified in the oil and therefore the oil is the continuous phase. Oil-based muds can be either all-oil based or water-in-oil macroemulsions, which are also called invert emulsions. In oil-based mud the oil may consist of any oil that may include, but is not limited to, diesel, mineral oil, esters, or alpha-olefins. Solid particles, such as weighting agents, may also be suspended in WBMs, with the use of various viscosifying or suspending agents to help keep the solids in suspension.

It is apparent to those selecting or using a drilling fluid for oil and/or gas exploration that an essential component of a selected fluid is that it be properly balanced to achieve the necessary characteristics for the specific end application. Because drilling fluids are called upon to perform a number of tasks simultaneously, this desirable balance is not always easy to achieve.

The density of aqueous drilling fluids may also be increased by dissolving salts therein. The density of the fluid is important because it must balance the density of the fluids in the formation and prevent them from entering the wellbore during drilling. Such salts include, but are not necessarily limited to, sodium chloride, magnesium chloride, calcium chloride, potassium chloride, sodium formate, potassium formate, cesium formate, sodium bromide, calcium bromide, zinc bromide, ammonium chloride, zinc chloride, calcium nitrate, potassium acetate, magnesium acetate and combinations thereof. Sometimes a water-based drilling fluid may be saturated or near-saturated with salts and a change will occur, such as a change in pH, fluid temperature, etc., and the salts will then settle and precipitate out. Such a phenomenon has at least two disadvantages: the salts will not be able to perform their stated function, and the solid salts may cause problems and difficulties downhole and may have to be removed in a separate operation.

Additionally, in situations where an operator is drilling through a formation containing salt, it is important that the drilling mud be near-saturation, at saturation or supersaturated with salts to inhibit or prevent the drilling mud from leaching salt from the formation during drilling. This is a particular concern when drilling through a salt dome, massive "sub-salt" beds typically found in offshore geological formations which many times are hundreds to thousands of feet in thickness and depth or similar formation. As used herein, the term "at least saturated with salt" includes the condition of saturated with salt and supersaturated with salt.

It is thus desirable that methods and compositions be devised to inhibit or prevent the settling out or precipitation of salts from an aqueous drilling fluid containing them.

SUMMARY

There is provided, in one non-limiting form, an aqueous, salt-stabilized drilling fluid that includes water, at least one salt, at least one weighting agent, at least one viscosifying agent, and at least one salt agglomeration and settling inhibiting agent. The salt agglomeration and settling inhibiting agent includes, but is not necessarily limited to, commonly referred to "steepwater solubles" which include organic liquids formed from the residue of wet processing of grains, sugar cane, sugar beets, and similar plants for the food and beverage industries for consumption by human or animals, or an organic liquid formed from the residue of wet-processing grains, sugar cane, sugar beets, and similar plants in the food and beverage industries for consumption by human or animals, and also whey, wine-making residues and combinations thereof.

There is additionally provided in an alternate embodiment a method for inhibiting the settling of salt and/or the agglomeration of a salt in an aqueous drilling fluid that involves adding to water before, during or after the addition of at least one salt, at least one weighting agent and at least one viscosifying agent, an amount of at least one salt settling inhibiting agent. The amount of salt crystal agglomeration inhibiting agent is effective to inhibit the settling of the salt, where the salt crystal agglomeration and settling inhibiting agent includes, but is not necessarily limited to, "steepwater solubles" which include organic liquids formed from the residue of wet processing of grains, sugar cane, sugar beets, and similar plants in the food and beverage industries for consumption by human or animals, and also whey, winemaking residues and combinations thereof.

A non-restrictive method is further provided for drilling through a subterranean formation containing salt, which method involves drilling a wellbore with a drill string in a subterranean formation that contains various salts using an aqueous, salt-stabilized drilling fluid. The salt-stabilized drilling fluid is as described above.

Further there is supplied in another non-limiting embodiment a method for inhibiting formation of hydrates, which method involves contacting a fluid that includes water, low concentration brines, and hydrate-forming guest molecules that form hydrates at hydrate forming conditions, with an amount of at least one hydrate inhibitor effective to inhibit formation of hydrates at the hydrate forming conditions. The hydrate inhibitor includes, but is not necessarily limited to, "steepwater solubles" which include organic liquids formed from the residue of wet processing of grains, sugar cane, sugar beets, and similar plants for the food and beverage industries for consumption by human or animals, and also whey, wine-making residues and combinations thereof.

A hydrate-inhibited fluid is further provided in a different, non-restrictive version, which includes brine, hydrate-forming guest molecules; and at least one hydrate inhibitor in an amount effective to inhibit formation of hydrates at hydrate forming conditions. Again, the hydrate inhibitor includes, but is not necessarily limited to, "steepwater solubles" which includes organic liquids formed from the residue of wet processing of grains, sugar cane, sugar beets, and similar plants for the food and beverage industries for consumption by human or animals, and also whey, wine-making residues and combinations thereof.

DETAILED DESCRIPTION

Figure 1:
FIG. 1 is a photograph of five jars each containing a drilling fluid of a different composition demonstrating effectiveness salt agglomeration and settling agents described herein for the fluids of Jars 2 and 4.

It has been unexpectedly discovered that salt crystal agglomeration and settling inhibiting agents may be added to aqueous drilling fluids to inhibit or prevent the salts dissolved therein from precipitating or settling out of solution. More specifically there is disclosed a new and improved, environmentally acceptable drilling fluid additive for supersaturated brine fluids for use in drilling into massive salt formations without the formation of large agglomerates or accumulation of solid salt crystals in the pits, storage tanks, vessels, pumps, and/or lines when these supersaturated type fluids are static or in motion. For example, the methods and compositions herein will allow the use of myriad forms of wet milled grains, corn, sorghum, whey, starch, whey, grapes, vintner's tank bottoms or "Vintner's Condensed Solubles", "steepwater solubles" or an organic liquid formed from the residue of wet processing of grains, sugar cane, sugar beets, and similar plants for the food and beverage industries for consumption by human or animals, and various dairy industry waste streams to be utilized as a stabilizer in a salt saturated solution. Collectively these materials may be known as "steepwater solubles". These saturated salt solutions may contain excess salts of types including but not limited to calcium, sodium, magnesium and calcium chloride(s), formates of sodium, potassium, and cesium; bromides of sodium and zinc, and any combination of these or other salts commonly used in drilling and completing of wells, both on land and offshore environments typically in search of hydrocarbons which may or may not occur.

As defined herein, "steepwater solubles" include organic liquids formed from the residue of wet processing of grains, sugar cane, sugar beets, and similar plants for the food and beverage industries for consumption by human or animals, are derived from steeping a grain or other fibrous cane or vegetable processes. More specifically, these materials are by-products of a milling process of grain including, for example, the wet milling of shelled corn, wheat, sorghum, barley and soybeans, sugar cane, and sugar beets. A wet milling process for corn, for example, is often employed to obtain staple products such as corn oil, dextrose, corn syrup, high fructose corn syrup, dextrins, dry starches and animal feeds. While the process is described below in connection with shelled corn, it is to be understood that steepwater can be created as a byproduct in an essentially similar process using wheat, sorghum, barley or soybeans as well as a by-product in the milling of other grains, sugar cane, and sugar beets.

The principle steps in a wet milling of shelled corn include steeping, milling, recovering and processing. During the steeping process, corn kernels are softened by soaking them in a hot solution containing a very small amount of sulfuric dioxide or other similar acidic component (though sulfuric dioxide is normally omitted when the grain is wheat because it destroys the vitality of wheat gluten). The softened kernels are then separated from the steepwater and further processed depending upon the desired end product. The remaining steepwater contains solubles which, after the steepwater is evaporated and/or dried, are typically recovered for use as nutritional additives in feeds for livestock. Although drying is useful in some non-limiting embodiments, steepwater solubles may be utilized in the form obtained from the milling process or dried to a water content of less than about 50%, by weight, in another non-restrictive version to less than about 25%, alternatively to less than about 10% and in another non-limiting embodiment to less than about 5%. Essentially dry steepwater solubles that are then dried, with a water content of about 1-2%, is useful for economical transport (less inert material is being moved) and for economical application of compositions herein. Typically, before any drying, steepwater contains between 10% and 30% solubles. By drying, the ratio may be adjusted to any desirable level.

Further details about the preparation of steepwater solubles or an organic liquid formed from the residue of wet processing of grains may be had with reference to U.S. Pat. Nos. 5,635,101 and 5,965,058, incorporated herein by reference in their entirety. The steepwater solubles materials are disclosed in these U.S. patents as antifreezes and deicing compositions. No mention is made of stabilizing salt in drilling fluids.

The steepwater solubles may have an almost syrup-type consistency but usually is less viscous, in liquid form. Physically, the product comes from the bottom of storage tanks after the grain (e.g. corn) is wet-milled (water is used in the process) and it sits for a period of time and then the tank bottoms are cleaned and the result is a solids-laden, brownish "mash" type product. That is why it contains some natural alcohol (volatiles) by content. Without wishing to be limited to any particular theory, it is believed that the alcohol content may be an important part of its inherent ability to lower freezing point of salts or its use as a de-icing material sprayed on road ways with or without salts, as described in the previously noted patents. As noted in those patents, steepwater solubles also contain proteins, fatty organic material and trace alkaline earth metal elements.

In another non-limiting embodiment whey is used as a salt crystal and agglomeration and settling inhibiting agent or gas hydrate inhibitor. Whey is defined herein as the liquids that remain after the coagulated cheese has been removed from various types of milk. In the process of cheese manufacturing, the non-soluble sugars, carbohydrates, protein, fat and minerals are coagulated and separated from the milk. The fluid remaining after the coagulation process is known as whey. Whey may be made from a variety of milks, including the milks of cows, goats, buffalo, and sheep. Whey is sometimes further treated to coagulate more of the soluble constituents to produce other cheeses, for example, mozzarella. Even when the whey is further treated, the remaining fluid is still called whey. In one non-limiting embodiment, typically whey is evaporated to the point that the liquid contains about 50% solubles, and then the evaporated whey is used as an animal feed additive.

Further details about the preparation of whey may be had with reference to U.S. Pat. Nos. 5,709,812 and 5,919,394, incorporated herein by reference in their entirety. The whey materials described in these U.S. patents are disclosed as antifreezes and deicing compositions. No mention is made of stabilizing salt in drilling fluids.

It has been additionally found that wine-making residues may be useful to stabilize salt containing aqueous fluids and to inhibit the unwanted formation of hydrates. In one non-restrictive version, wine-making residues are the solubles that settle during the fermentation process, said solubles being commonly known in the wine making industry as "Vintners' Condensed Solubles" (or, more simply, "VCS"), and less technically known as "wine bottoms" and "lees". Generally, the wine process consists of fermenting liquids that are extracted from said fruits or grains. For instance, with rice wine, the starches are usually converted to sugar prior to fermentation. The method and compositions herein are directed at the non-potable solubles that settle to the bottom of the wine vats. The bottom liquids may be concentrated at 50% solubles, which solubles, after the liquid is evaporated and/or dried, are recovered typically for use as nutritional additives in feeds for livestock and/or fertilizer/mulching material for vineyards. The condensed composition is water soluble, negligibly corrosive, inexpensive, and widely-available in large quantities.

Further details about the preparation of wine-making residues may be had with reference to U.S. Pat. Nos. 5,709,813 and 5,932,135, incorporated herein by reference in their entirety. Again, the wine-making residues described in these U.S. patents are disclosed as antifreezes and deicing compositions. No mention is made of stabilizing salt in drilling fluids.

It is believed that salt crystal conglomerate and settling inhibiting agent (e.g. steepwater solubles, etc.) may be useful to prevent or inhibit the settling of a wide variety of salts. Salts useful in aqueous drilling fluids include, but are not limited to, sodium chloride, magnesium chloride, calcium chloride, potassium chloride, sodium formate, potassium formate, cesium formate, ammonium formate, sodium bromide, potassium bromide, calcium bromide, zinc bromide, ammonium chloride, zinc chloride, calcium nitrate, potassium acetate, magnesium acetate and combinations thereof. Such fluid laden with salts may be used as a drilling, drill-in, and/or completion fluid(s) utilized in the drilling or completion of any type of well drilled or bored into the earth in search of hydrocarbons, whether hydrocarbons are present or not. The use of this salt conglomerate and settling inhibiting agent may be used to enhance completion fluids that are otherwise solids free, but may contain for specific purposes a given quantity of especially sized (mean particle size in microns dependent upon operation) solid salt crystals such as calcium carbonate to prevent the loss of the otherwise solids free brine, through perforations into the formation whether in a cased or open hole completion operation. These intentionally present solid salt crystals are sometimes referred to herein as "undissolved salts". The methods and compositions are also expected to be useful in pipeline cleaning and other oil field related uses. It is expected that the methods and compositions may be utilized to prevent the undesired forming of salt slabs in blending and facility storage tanks, boat storage tanks, or blockage of transfer lines, etc. when such slabs and other sizable crystals (from small aggregates to large agglomerations of salt crystals that the settle out or precipitate from saturated and supersaturated fluids according to Stokes's Law). It is further anticipated that the methods and compositions will be useful for pumping down the well, including, but not necessarily limited to, kill, choke, riser, drill pipe, casing, BOP stack, booster lines, umbilical lines, pipelines transporting hydrocarbons and produced brines naturally occurring in-situ, trunk lines or any place that salt or gas hydrate crystals may form any blockage which is of major concern, particularly in deep water drilling when using low salinity water or aqueous fluids, but at gas hydrate forming conditions of high pressure and low temperature. In one non-limiting embodiment the gas hydrate forming conditions include, but are not necessarily limited to, a temperature below about 30° F. (−1° C.), alternatively below about 39° F. (4° C.) or even below about 57° F. (14° C.), and a pressure of about 1000 psig (7 MPa) or above, alternatively about 145 psig (1 MPa) or above.

The product composition of steepwater solubles varies whether in liquid or dry form (or method of use) but is also available as cattle feed or supplement primarily in its dried state or form. In the liquid state it may be utilized having a specific gravity in the range from about 1.01 to about 1.2. Alternatively, the specific gravity may range higher, in a non-limiting example from about 1.18 to about 1.2. Suitable, but not limiting examples of steepwater solubles may have a pH of from about 3.5 to about 4.8, and a boiling point of at least 212° F. (100° C.). The steepwater solubles may contain volatile(s) organic components of up to and including the range of from about 45 to about 55% by volume. As noted, the steep-water solubles may also contain proteins, fatty organic material and trace alkaline earth metal and metal elements. Specific, but non-restrictive examples of commercially available steepwater solubles include, but are not limited to, those available from Meridian Technologies, The Woodlands, Tex., and Earth Friendly Chemicals (formerly Ice Ban USA), Virginia Beach, Va., and/or directly sourced from any brewery, winery, dairy processing plant, fibrous plant processing facility for cane, grain, or similar organic plant processer for the food and beverage industry whether for human or animal consumption.

Useful proportions or amounts of the salt conglomerate and settling inhibiting agent in the aqueous fluids may range from 1.0% by volume up to about 25% by volume based on the total fluid volume treated. In an alternate embodiment, the proportion may range from about 3 to about 13 volume % by volume, or from about 3 independently to about 5% by volume based on the total fluid, where "independently" means that any lower threshold mentioned above may be combined with any upper threshold mentioned previously.

Pressure limitations on the methods herein are not known. To date, the expected temperature range may be from about 0° F. to about 212° F. (about −18 to about 100° C.).

It will be appreciated that it is not necessary for salt agglomeration and settling to be completely eliminated for the compositions and methods herein to be considered successful. The methods and compositions may be considered successful if the settling or crystal agglomerations of salt are inhibited in a brine fluid as compared with an otherwise identical fluid absent the salt agglomeration and settling inhibiting agent (e.g. steepwater solubles).

Further, in brine-based drilling and workover fluids, there may be uses of these agents to aid in salt crystallization when mixing two different salts, such as NaCl and CaCl.

The drilling fluids herein may also contain conventional components such as suspended solids which may include, but are not limited to, weighting agents, e.g. high-gravity solids (HGS) such as barite (barium sulfate), hematite, siderite, ilmenite, manganese tetraoxide, calcium carbonate and the like, added to a mud to increase its density (specific gravity), also known as weighting materials. Low gravity solids (LGS) may also be used. In the context herein, weighting agents including bridging agents, which may be many of the same materials noted herein for weighting agents, including, but not necessarily limited to, calcium carbonate, suspended salts or oil-soluble resins. Bridging agents are solids added to a drilling fluid to bridge across the pore throats or fractures of an exposed rock thereby building a filter cake to prevent loss of mud or excessive filtrate. Bentonite (sodium montmorillonite) is a useful additive for increasing the viscosity of drilling muds, as are other clays used as viscosifying agents, along with xanthan gum or guar gum polymers, polyanionic cellulosic polymer, and the like. Other conventional additives or components for water- or brine-based drilling fluids include, but are not necessarily limited to, partially-hydrolyzed polyacrylamide (PHPA) (to control wellbore shales or extend bentonite clays), pH modifiers or adjusters (lime, KOH, NaOH, magnesium oxide), conventional shale or clay stabilizers (asphaltines, lignins, lignosulfonates) corrosion inhibitors, hydrogen sulfide scavengers, oxygen scavengers, and hydrate inhibitors, and the like.

It has also been discovered that these steepwater solubles fluid additives are useful gas hydrate suppressant agent or inhibitors. The steepwater solubles would provide an environmentally friendly method to prevent or suppress the formation of hydrates in deep water drilling under conditions of low temperatures and high pressure where hydrates may form naturally or through other means (e.g. fluids in BOPs, kill lines, choke lines, well heads, pipelines, etc.) in place of glycerin (glycerol) or glycols currently and typically used.

The steepwater solubles may be added to the drilling fluid at or near the end stage of the fluid building process. However, it will be appreciated that the steepwater solubles product may be added at any stage in the fluid building process. As noted, the product is added and mixed into the drilling fluid to obtain the desired properties that prevent salt issues in the drilling fluid.

A number of hydrocarbons, especially lower-boiling light hydrocarbons, in formation fluids or natural gas are known to form hydrates in conjunction with the water present in a fluid system or naturally occurring (connate formation brines) under a variety of conditions—particularly at a combination of lower temperature and higher pressure. The hydrates usually exist in solid forms that are essentially insoluble in the fluid itself. As a result, any solids in a formation or natural gas fluid are at least a nuisance for production, handling and transport of these fluids. It is not uncommon for hydrate solids (or crystals) to cause plugging and/or blockage of pipelines or transfer lines or other conduits, valves and/or well control safety devices and/or other equipment, resulting in shutdown, loss of production and risk of explosion or unintended release of hydrocarbons into the environment either on-land or offshore. Accordingly, hydrocarbon hydrates have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly $C_1$ (methane) to $C_4$ hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulfide are known to form hydrates under the proper conditions. Indeed, known hydrate-forming guest molecules include, but are not limited to, methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, and xenon.

It is further expected that the salt agglomeration and settling inhibiting agent (e.g. steepwater solubles, whey, winemaking residues, etc.) will find utility as gas hydrate inhibitors in fresh water and light weight brines as well as saturated brines, and also to dislodge hydrate plugs in blowout preventer (BOP) stacks or cavities, service lines, umbilical lines for drilling and production, valves and other places where hydrates may and do commonly form due to high pressure and low temperature.

It will also be appreciated that it is not necessary for the formation of gas hydrates to be completely eliminated for the compositions and methods herein to be considered successful. The methods and compositions may be considered successful if gas hydrate formation is inhibited to at least some extent in the brine fluid as compared with an otherwise identical fluid absent the salt agglomeration and settling inhibiting agent (e.g. whey, steepwater solubles, etc.), and similarly with respect to dislodging or re-dissolving already formed hydrate blockages.

The invention will be further illustrated with respect to the following example which is not intended to limit the scope of the invention in any way, but is provided to further explain and express the inventive concept.

Example 1

The basic make-up of a super-saturated drilling fluid includes a 10.0 ppg (1.2 kg/liter) sodium chloride (saturated 26.0% by wt.) brine solution, with 2.0 ppb (5.7 g/liter) xanthan gum polymer (XAN-PLEX® D water based drilling fluid available from Baker Hughes Drilling Fluids), barite to 15.6 ppg (1.9 kg/liter) and then the addition of 110 ppb (pounds per barrel) (314 kg/liter) of evaporative salt (sodium chloride) crystals to form a supersaturated, high density drilling fluid primarily used for the drilling of massive salt formations located in deep water environments found geologically in many offshore basins world-wide, but also in some land locations where the salt beds may be hundreds to thousands of feet in thickness or layered between clay/shale laminates. This fluid may be diluted with sea-water, fresh water, and/or contain other common drilling fluid additives depending on drilling conditions. A problem has been discovered that the excess 110 ppb (314 kg/l) NaCl added to the already saturated NaCl solution begins after a relatively short period of time, usually less than 48 hours, to form large aggregate crystals that then become large enough to settle even in the presence of highly developed and expensive polymeric viscosifiers. The excess salt crystals begin to form agglomerates and settle to the bottom of the storage tanks at the mixing or preparation plant or in the tanks on the boats transiting to the drilling rig locations, and these larger crystals may be as small as one (1) inch (2.5 cm) in diameter to as large as bowling balls. Typically over a few more hours of time they form into large, hard slabs of salt that then are in a state that is not easily physically removed from the tanks at the plant or on a vessel. The fluid was stored or transported in for use in the drilling process, including valves and lines used to transport fluids from mixing pits or tanks to storage tanks or vats to the storage pits at the rig.

However, it was unexpectedly found that by the addition of salt agglomeration and settling inhibiting agents, specifically steepwater solubles, in various ranges, typically in the 3-5% by volume range but also in ranges of from about 1.0% by volume to about 25% by volume, utilized in the drilling fluid the salt will not form solid soluble crystals or agglomerates that create costly problems in accumulation in storage pits, tanks, vats, pipelines, pumps, well heads, umbilical lines, choke, kill or circulation lines from a rig to the sea floor, or any means that otherwise store or allow the movement of these types of fluids.

Example 2

Figure 2:
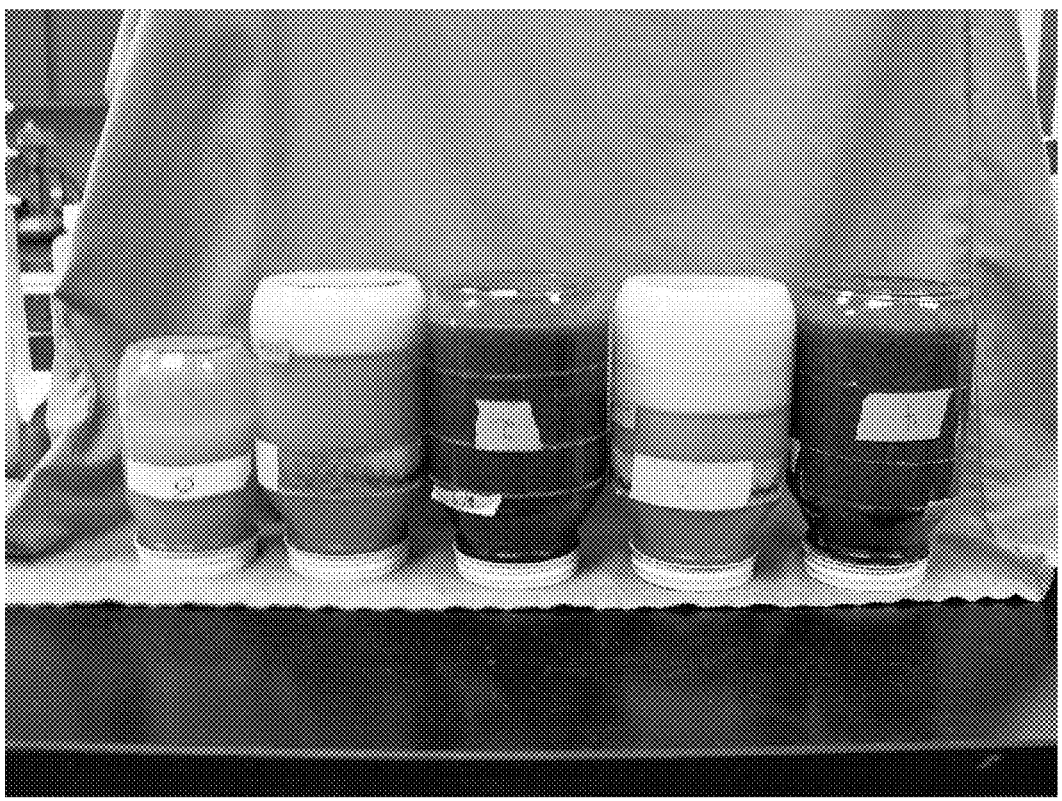
FIG. 2 is a photograph of the same five jars with the jars in inverted position again demonstrating no hard settling for the fluids of Jars 2 and 4.

Shown in FIGS. 1 and 2 are five jars, each containing a different drilling fluid formulation. The only difference between the photographs is that in FIG. 1, the jars are right side up and in FIG. 2 they are in inverted position to demonstrate that there is no hard settling of the components of the fluids of Jars 2 and 4. The formulations of the drilling fluids are as shown below in Table I; the jars are numbered sequentially left to right in the photos. XAN-PLEX® D polymer viscosifer is available from Baker Hughes Drilling Fluids. The abbreviation "s.g." refers to specific gravity, which may also be expressed as g/cm³, where water is 1.0 s.g. or 1.0 g/cm³.

the same fluid as that of Jar 1, but also 5 vol % of a salt agglomeration and settling inhibiting agent. The salt agglomeration and settling inhibiting agent was a steepwater soluble from the wet-corn milling process. Although dark due to the agent, when examined closely it is apparent that there is no hard settling has occurred in Jar 2 in either FIG. 1 or FIG. 2.

Similarly, Jar 3 contains a fluid identical to the fluid of Jar 1 except that the amount of dry NaCl salt has been doubled; however, no barite weighting agent was included. Again, this fluid clearly exhibits hard settling both in upright (FIG. 1) and inverted (FIG. 2) positions. Jar 4 contains the same fluid as that of Jar 3, but also 5 vol % of a salt agglomeration and settling inhibiting agent (the same amount as in Jar 2). Once more, although the fluid is dark due to the additive, when examined closely it is apparent that there is no hard settling in either FIG. 1 or FIG. 2 for this jar. These fluids further demonstrate the effectiveness of the salt agglomeration and settling inhibiting agents described herein at stabilizing salt-containing drilling fluids. That is, no agglomeration or settling was observed in the treated samples of Jars 2 and 4 even though no additional viscosifying polymer was added above that typically added (2 ppb (5.7 kg/l) XAN-PLEX D polymer to the saturated sodium chloride fluid. Conversely, it was apparent and one could mark on Jars 1 and 3 as time progressed the continued solidifying and settling of the salt crystals into a tighter and thus smaller layer from week to week in the first weeks.

In the foregoing specification, the invention has been described with reference to specific embodiments thereof, and has been suggested as effective in providing effective methods and compositions for inhibiting and preventing the settling of salts in aqueous brine drilling fluids, particularly such salt-saturated fluids. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of salt agglomeration and settling inhibiting agent (e.g. steepwater solubles) and brines and other aqueous fluids falling within the claimed parameters, but not specifically identified or tried in a particular composition to stabilize the fluids and brines herein, are anticipated to be within the scope of this invention. Further, although the invention is often discussed in terms of a method to inhibit or prevent the agglomeration and settling

TABLE I

| | |
|---|---|
| Jar 0 | 10.0 ppg (1.19 s.g.) NaCl 26 wt % + 2 ppb (5.7 kilogram/liter) XAN-PLEX D Polymer (Control) - No weighting agents (barite) or dry NaCl additions. |
| Jar 1 | 10.0 ppg (1.19 s.g.) NaCl 26 wt % + 2 ppb (5.7 kg/l) XAN-PLEX D Polymer + barite to 14.7 ppg (1.76 s.g.). + 110 ppb (314 kg/l) dry NaCl salt. |
| Jar 2 | 10.0 ppg (1.19 s.g.) NaCl 26 wt % + 2 ppb (5.7 kg/l) XAN-PLEX D Polymer + barite to 14.7 ppg (1.76 s.g.). + 110 ppb (314 kg/l) dry NaCl salt + 5% by volume anti-agglomeration salt crystal settling prevention agent. |
| Jar 3 | 10.0 ppg (1.19 s.g.) NaCl 26 wt % + 2 ppb (5.7 kg/l) XAN-PLEX D Polymer + 220 ppb (628 kg/l) dry NaCl salt (no barite). |
| Jar 4 | 10.0 ppg (1.19 s.g.) NaCl 26 wt % + 2 ppb (5.7 kg/l) XAN-PLEX D Polymer + 220 ppb (628 kg/l) dry NaCl salt (no barite) + 5% by volume anti-agglomeration salt crystal settling prevention agent. |

The drilling fluids have been in the jars for at least nine months. It will be seen that Jar 0 is a control having no weighting agents (e.g. barite) or dry NaCl addition. Jar 1 contains a fluid including the indicated amount of barite and dry NaCl. This fluid clearly exhibits hard settling both in upright (FIG. 1) and inverted (FIG. 2) positions. Jar 2 contains out of salts in brines, the method is expected to be useful in inhibiting or preventing the formation of gas hydrates in fresh water or brine drilling fluids.

The present invention may suitably comprise, consist or consist essentially of the elements disclosed and may be practiced in the absence of an element not disclosed. In one non-limiting embodiment, the aqueous, salt-stabilized drilling fluid may consist essentially of or consist of water, at least one salt, at least one weighting agent, at least one viscosifying agent, and least one salt agglomeration and settling inhibiting agent. Alternatively, a hydrate-inhibited fluid may consist essentially of or consist of water or brine, hydrate-forming guest molecules, and at least one hydrate inhibitor which may be steepwater solubles, whey, wine-making residues and combinations thereof.

The words "comprising" and "comprises" as used throughout the claims is to interpreted "including but not limited to".

The present invention may suitably comprise, consist or consist essentially of the elements disclosed and may be practiced in the absence of an element not disclosed. In a non-limiting instance, the aqueous, salt-stabilized drilling fluid may consist essentially of, or alternatively consist of, water, at least one salt, at least one weighting agent, at least one viscosifying agent, and at least one salt agglomeration and settling inhibiting agent selected from the group consisting of steepwater solubles, whey, wine-making residues and combinations thereof.

What is claimed is:

1. A method for inhibiting the agglomeration and settling of salt in an aqueous drilling fluid comprising:
   providing an aqueous drilling fluid made by a process comprising:
      adding to water:
         at least one weighting agent,
         at least one viscosifying agent, and
         at least one salt agglomeration and settling inhibiting agent present in a proportion of 13 wt % or less based on the total drilling fluid effective to inhibit the settling of the salt,
      where the salt agglomeration and settling inhibiting agent is selected from the group consisting of steepwater solubles, whey, wine-making residues and combinations thereof; the adding to water occurs before, during or after the addition of the at least one salt, and where the at least one salt agglomeration and settling inhibiting agent is present in a proportion of from 1.0 volume % to about 13 volume % based on the total drilling fluid; and
   pumping the aqueous drilling fluid down a well and where the drilling fluid has a reduced tendency for the salt to settle out as compared with an otherwise identical fluid absent the salt agglomeration and settling inhibiting agent.

2. The method of claim 1 where the salt agglomeration and settling inhibiting agent is steepwater solubles comprising an organic liquid formed from the residue of wet processing of a grain selected from the group consisting of corn, soybeans, wheat, barley, sorghum, sugar cane, sugar beets, and combinations thereof, and where the organic liquid has a specific gravity of between about 1.01 to about 1.2 and a pH of from about 3.5 to about 4.8.

3. The method of claim 1 where the salt is selected from the group consisting of sodium chloride, magnesium chloride, calcium chloride, potassium chloride, sodium formate, potassium formate, cesium formate, ammonium formate, sodium bromide, potassium bromide, calcium bromide, zinc bromide, ammonium chloride, zinc chloride, calcium nitrate, potassium acetate, magnesium acetate and combinations thereof.

4. The method of claim 1 where the aqueous drilling fluid is at least saturated with salt.

5. A method for drilling through a subterranean formation containing salt comprising:
   drilling a wellbore with a drill string in a subterranean formation containing salt using an aqueous, salt-stabilized drilling fluid, pumped down the wellbore, the aqueous, salt-stabilized drilling fluid comprising:
      water;
      at least one salt;
      at least one weighting agent;
      at least one viscosifying agent; and
      at least one salt crystal agglomeration and settling inhibiting agent selected from the group consisting of steepwater solubles, whey, wine-making residues and combinations thereof, the salt crystal agglomeration and settling inhibiting agent present in a proportion of 13 wt % or less based on the total drilling fluid effective to inhibit the settling of the salt, where the at least one salt agglomeration and settling inhibiting agent is present in a proportion of from 1.0 volume % to about 13 volume % based on the total drilling fluid; and
   reducing the tendency for the salt to settle out as compared with an otherwise identical fluid absent the salt agglomeration and settling inhibiting agent.

6. The method of claim 5 where the salt agglomeration and settling inhibiting agent is steepwater solubles comprising an organic liquid formed from the residue of wet processing of a grain selected from the group consisting of corn, soybeans, wheat, barley, sorghum, sugar cane, sugar beets, and combinations thereof, and where the organic liquid has a specific gravity of between about 1.01 to about 1.2 and a pH of from about 3.5 to about 4.8.

7. The method of claim 5 where the salt is selected from the group consisting of sodium chloride, magnesium chloride, calcium chloride, potassium chloride, sodium formate, potassium formate, cesium formate, ammonium formate, sodium bromide, potassium bromide, calcium bromide, zinc bromide, ammonium chloride, zinc chloride, calcium nitrate, potassium acetate, magnesium acetate and combinations thereof.

8. The method of claim 5 where the aqueous drilling fluid is at least saturated with salt.

9. A method for inhibiting formation of hydrates comprising:
   contacting a fluid including:
      water; and
      hydrate-forming guest molecules that form hydrates at hydrate forming conditions,
   at least one hydrate inhibitor effective to inhibit formation of hydrates at the hydrate forming conditions, where the hydrate inhibitor is selected from the group consisting of steepwater solubles, whey, wine-making residues and combinations thereof, the hydrate inhibitor present in a proportion of 13 wt % or less based on the total fluid effective to inhibit the settling of the salt, where the at least one salt agglomeration and settling inhibiting agent is present in a proportion of from 1.0 volume % to about 13 volume % based on the total fluid; and
   where the amount of at least one hydrate inhibitor reduces the tendency for the salt to settle out as compared with an otherwise identical fluid absent the salt agglomeration and settling inhibiting agent.

10. The method of claim 9 where the water further comprises water selected from the group consisting of low density brine and connate water.

11. The method of claim 9 where the hydrate inhibitor is steepwater solubles comprising an organic liquid formed from the residue of wet processing of a grain selected from the group consisting of corn, soybeans, wheat, barley, sorghum, sugar cane, sugar beets, and combinations thereof, and where the organic liquid has a specific gravity of between about 1.01 to about 1.2 and a pH of from about 3.5 to about 4.8.

12. The method of claim 9 where the fluid comprises a salt selected from the group consisting of sodium chloride, magnesium chloride, calcium chloride, potassium chloride, sodium formate, potassium formate, cesium formate, ammonium formate, sodium bromide, potassium bromide, calcium bromide, zinc bromide, ammonium chloride, zinc chloride, calcium nitrate, potassium acetate, magnesium acetate and combinations thereof.

13. The method of claim 9 where the fluid is a drilling fluid and further comprises at least one weighting agent and at least one viscosifying agent.

14. A method for inhibiting the agglomeration and settling of salt in an aqueous drilling fluid comprising:
   providing an aqueous drilling fluid made by a process comprising:
      adding to water:
      at least one weighting agent,
      at least one viscosifying agent, and
      at least one salt agglomeration and settling inhibiting agent effective to inhibit the settling of the salt, and
   pumping the aqueous drilling fluid down a well and where the drilling fluid has a reduced tendency for the salt to settle out as compared with an otherwise identical fluid absent the salt agglomeration and settling inhibiting agent;
   where the salt agglomeration and settling inhibiting agent is selected from the group consisting of steepwater solubles, whey, wine-making residues and combinations thereof; and the adding to water occurs before, during or after the addition of the at least one salt so that the aqueous drilling fluid is at least saturated with salt, and where the salt agglomeration and settling inhibiting agent is present in a proportion of from about 3 to about 13 volume % based on the total drilling fluid, and where the drilling fluid has a reduced tendency for the salt to settle out as compared with an otherwise identical fluid absent the salt agglomeration and settling inhibiting agent.

15. The method of claim 14 where the salt agglomeration and settling inhibiting agent is steepwater solubles comprising an organic liquid formed from the residue of wet processing of a grain selected from the group consisting of corn, soybeans, wheat, barley, sorghum, sugar cane, sugar beets, and combinations thereof, and where the organic liquid has a specific gravity of between about 1.01 to about 1.2 and a pH of from about 3.5 to about 4.8.

16. The method of claim 14 where the salt is selected from the group consisting of sodium chloride, magnesium chloride, calcium chloride, potassium chloride, sodium formate, potassium formate, cesium formate, ammonium formate, sodium bromide, potassium bromide, calcium bromide, zinc bromide, ammonium chloride, zinc chloride, calcium nitrate, potassium acetate, magnesium acetate and combinations thereof.

* * * * *